Dec. 22, 1953     M. S. JOHNSON     2,663,248
AUTOMATIC COFFEE MAKER
Filed Nov. 28, 1951
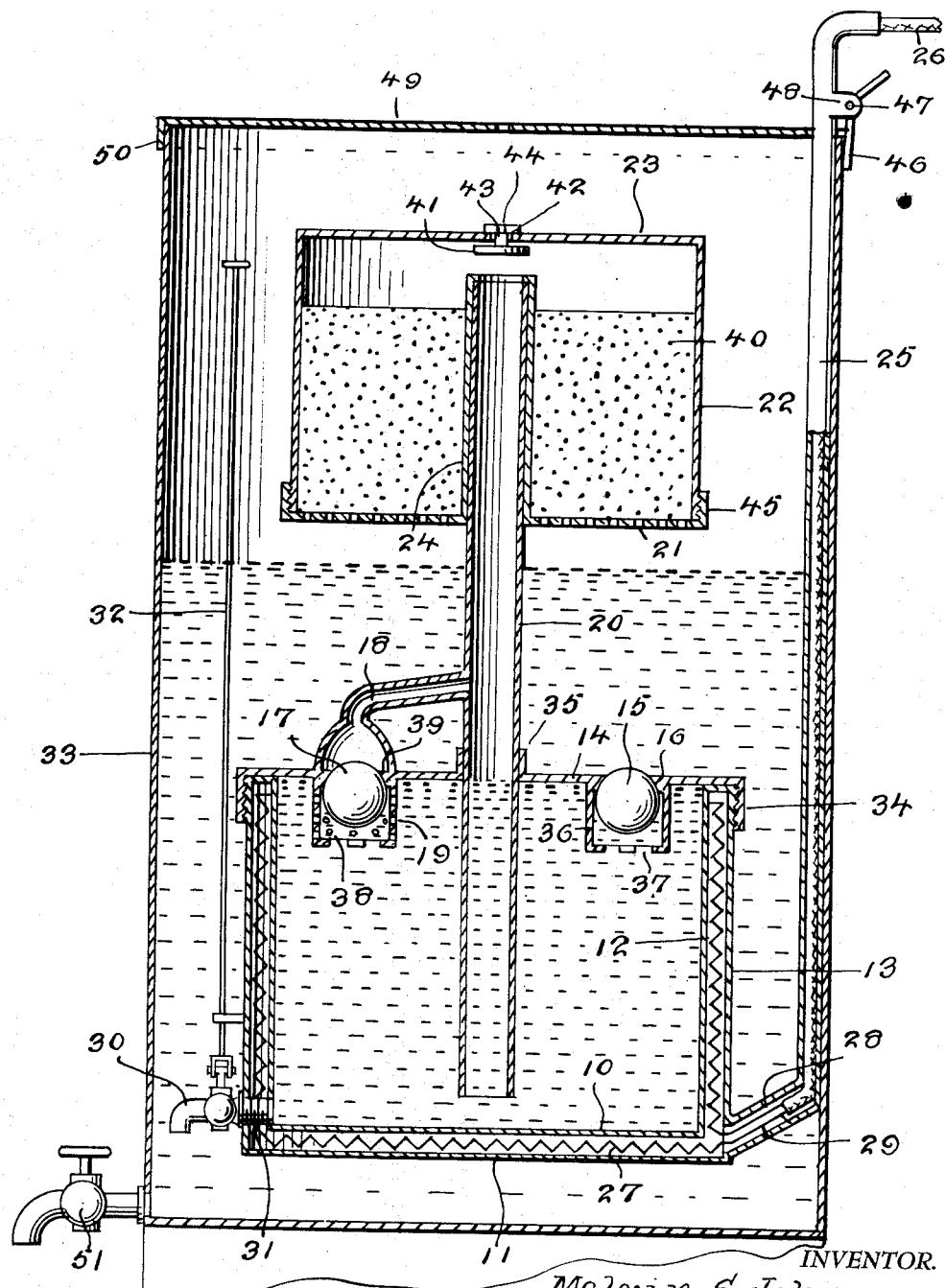
INVENTOR.
Melvin S. Johnson
BY Victor J. Evans & Co.
ATTORNEYS Patented Dec. 22, 1953

2,663,248

UNITED STATES PATENT OFFICE 2,663,248

AUTOMATIC COFFEE MAKER

Melvin S. Johnson, Moon Run, Pa.

Application November 28, 1951, Serial No. 258,687

5 Claims. (Cl. 99—310)

This invention relates to coffee makers of the vacuum or percolator type where water in a confined lower container is heated so that it travels upwardly by expansion and is discharged over coffee grounds in a perforated upper container and in particular a coffee maker wherein valves in a lower container drop by gravity when water is exhausted therefrom whereby water percolating through coffee grounds in an upper container drops into an outer shell or utensil in which the upper and lower containers are positioned.

The purpose of this invention is to provide an auxiliary coffee making unit that may be positioned in a kettle or other container whereby coffee may be made as it is required and the necessity of maintaining costly coffee urns in a restaurant or the like is obviated.

The conventional coffee urn requires constant attention of an attendant and urns of this type, suitable for even a small restaurant are comparatively costly. With this thought in mind this invention contemplates a coffee making unit that is adapted to be positioned in a container such as a pot, kettle or other utensil and which is provided with an independent heating element whereby with coffee grounds positioned in an upper perforated container of the unit water may be heated in a lower container and discharged over the coffee grounds.

The object of this invention is, therefore, to provide an improved coffee maker that may be provided as an independent unit and that may be used in vessels or other utensils ordinarily found in a kitchen or the like.

Another object of the invention is to provide a self contained coffee making unit that is adapted to be placed in a container for making coffee therein and that may readily be removed, cleaned and refilled with coffee grounds.

A further object of the invention is to provide an individual coffee making unit which is of a simple and economical construction.

With these and other objects and advantages in view the invention embodies a coffee making unit including a lower container having a heating element incorporated therein and float actuated valves in the upper end, an upper container having a perforated wall and suspended by a tube from the lower container and a handle having an electric cord through which current is supplied to the heating element in the lower container extended from the unit and adapted to support the unit in a surrounding vessel or the like.

Other features and advantages of the invention will appear from the following description taken in connection with the drawings wherein:

The drawing is a vertical section through the coffee maker showing the unit suspended by the handle thereof in a cylindrical container.

Referring now to the drawing wherein like reference characters denote corresponding parts the improved coffee maker of this invention includes a double wall lower container having a base formed with an upper panel 10 and a lower panel 11, an upwardly extended wall having an inner section 12 and an outer section 13, a cover 14 having a ball float valve 15 positioned to close an opening 16 therein, a similar ball float valve 17 positioned to close a passage 18 extended from the ball retaining cage 19 to a tube 20 extended from the lower container, an upper container having a perforated base 21 with a cylindrical wall 22 and an upper panel 23 carried by the tube 20 and having a tubular section 24 extended upwardly from the base 21 and surrounding the tube, and a tubular handle 25 which is attached to the lower container and through which an electric cord 26 extends.

The base and side wall of the lower container are formed with spaced elements providing an open area surrounding the container and an electric heating element, as indicated by the numeral 27 and which is provided with suitable insulating material is incorporated in the base and walls, as shown in the drawing. The electric cord 26 is provided with wires 28 and 29 which are connected to terminals of the electric heating element 27.

The lower container is provided with a valve 30 which is positioned in an opening 31 in the lower end of the lower container and the valve is provided with an extended stem 32 by which it may be actuated from the upper part of a surrounding casing which is indicated by the numeral 33.

The cover 14 of the lower container is provided with a threaded flange 34 and a hub 35 is provided at the center through which the tube 20 extends.

The float valve ball 15 is positioned in a valve cage 36 and the lower end of the cage is provided with openings 37.

The ball float valve 17 is also positioned in a cage 19 and the cage is provided with perforations 38 whereby with fluid in the lower container the ball 17 is retained against a seat 39 and the ball 15 against the seat 16 so that the lower container is substantially sealed.

Upon the application of electric current to the heating element 27 water in the lower container is converted into steam and as the water expands it passes upwardly through the tube 20 and is sprayed over coffee grounds, as indicated by the numeral 40, in the upper container having the side walls 22 and base 21.

The upper end of the upper container is provided with a baffle or shield 41 which covers air vents 42 and the shield is supported by a stud 43 having a nut 44 on the outer end.

The base 21, which forms a cover for the upper container is provided with a flange 45 that is threaded to the container and with the unit removed from the housing 33 the upper container may readily be removed from the upper end of the tube 20 and the base or cover removed to remove the coffee grounds and refill the upper container.

The handle or tube 25 of the unit is provided with a latch 46 that is pivotally mounted by a pin 47 between ears 48 extended from the side of the tube 25, thereby providing means for supporting the unit in an upright position as illustrated in the drawing.

The outer casing 33 is provided with a cover 49 having a flange 50 and a valve 51 is positioned in the lower end.

The tube 18 extended from the valve cage of the ball float valve 17 provides an air vent from the lower container to the tube 20 as shown.

With the parts formed in this manner the upper container is filled or partly filled with coffee grounds and with the unit positioned in a housing or casing 33 water is supplied to the lower container and as current is supplied to the heating element 27 water from the lower container is forced into the upper container where it passes downwardly through the coffee grounds and into the outer casing 33. The finished coffee is drawn from the valve or spigot 51 as it is required.

By this means the coffee making unit may be inserted in a utensil or other container and after making coffee therein the unit may be removed, the coffee grounds replaced with fresh ground coffee and the unit placed in another similar container. This cycle of operation may be continued with fresh coffee being made by the unit as coffee in the housing or utensil is used therefrom.

It will be understood that modifications may be made in the design and arrangement of the parts without departing from the spirit of the invention.

What is claimed is:

1. A coffee making unit comprising a lower container having a tube extended upwardly therefrom, an upper container having perforations in parts thereof positioned on said tube and supported thereby, a heating element in combination with said lower container, float actuated valves in the upper end of said lower container, a valve positioned in the lower part of the said lower container, a handle extended upwardly from the lower container in which wires for supplying current to the heating element are positioned and a vent with a baffle providing a shield therefor is provided in the upper end of the upper container.

2. In a coffee making unit, the combination which comprises a lower container having a double wall with an electric heating element incorporated in the area between sections of the walls thereof, a cover having valve openings therethrough threaded on the upper end of the lower container, a tube extended upwardly from the cover of said lower container, ball float valves positioned to close the openings in the cover of the lower container, one of said valves having a vent passage extended to a tube extended upwardly from the lower container, an upper container having a perforated lower end freely mounted on the upper end of said tube, vent openings in the upper end of the upper container, a shield positioned to cover said vent openings in the upper end of the upper container, and a tubular handle extended upwardly from the said lower container and through which an electric cord for supplying current to the heating element of the lower container extends.

3. In combination with a coffee making unit as described in claim 2, an outer casing in which said unit is positioned.

4. A coffee making unit as described in claim 2, wherein a latch is provided on the handle for retaining the unit in operative position, in a utensil or the like.

5. A coffee making unit as described in claim 2, wherein a valve is positioned in the lower end of the lower unit.

MELVIN S. JOHNSON.

References Cited in the file of this patent

UNITED STATES PATENTS

| Number | Name | Date |
|---|---|---|
| 291,941 | Rosebrook | Jan. 15, 1884 |
| 1,077,289 | Nash | Nov. 4, 1913 |
| 1,778,926 | Wiegand | Oct. 21, 1930 |
| 1,971,758 | Olds | Aug. 28, 1934 |
| 2,065,211 | Carvalho | Dec. 22, 1936 |
| 2,175,727 | Graham | Oct. 10, 1939 |